Figures 1, 2:
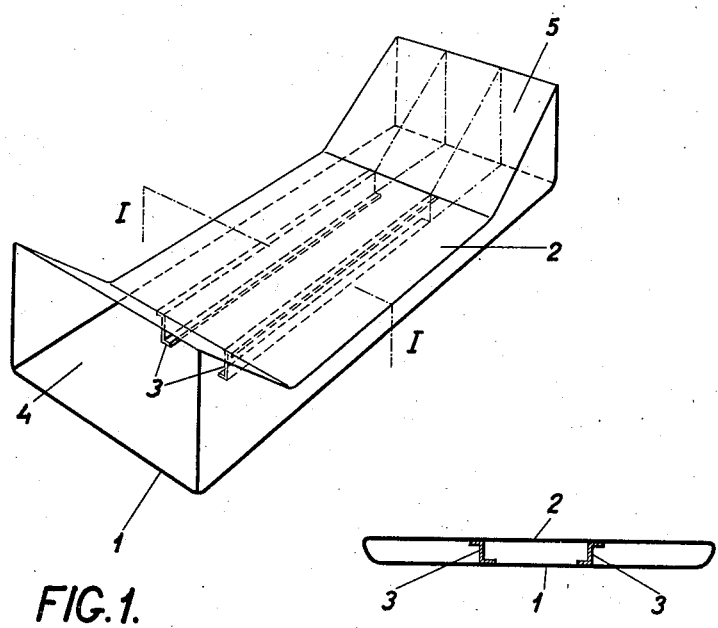

Oct. 1, 1940.  M. KLAVIK  2,216,670

FLOOR FOR AUTOMOBILES

Filed Dec. 20, 1938

Inventor
Milos Klavik
By Blinger, Atty.

Patented Oct. 1, 1940

2,216,670

UNITED STATES PATENT OFFICE 2,216,670

FLOOR FOR AUTOMOBILES

Miloš Klavík, Prague, Czechoslovakia

Application December 20, 1938, Serial No. 246,913
In Czechoslovakia August 21, 1937

1 Claim. (Cl. 296—1)

In automobiles with rear engines it is a difficult problem to supply sufficient cooling air to the engine without the provision of a radiator or the like at the front of the automobile and conduits leading therefrom to the rear engine compartment.

It has already been proposed to provide apertures at different parts of the body with conduits leading from said apertures to the radiator or engine arranged in the rear part. These arrangements are generally accompanied by the difficulty that the suction inlets arranged on the surface of the body are situated in regions where the airstream lines become detached from the surface of the body during rapid travel, whereby the necessary quantity of air for cooling can only be provided with great difficulty. It is at least necessary for this purpose to employ a considerable part of the engine power necessary for driving a very large fan or the like. The pressure regions on the surface of the body, that is to say, the regions where there is always an air pressure in consequence of the rapid travel, are all situated at the front part of the vehicle, for which reason it is very difficult to lead from the inlets situated in these favourable regions conduits to the rear of the vehicle without thereby reducing the useful internal space of the body itself.

According to the invention, the air is led from the pressure regions situated in the front part of the body by constructing the floor of the vehicle double throughout its entire width and leading the cooling air from the front to the rear through the space formed between the two walls of the floor. In addition, this space may be provided with longitudinal stiffening means which reinforce the floor thus constructed so that the latter forms a strong plate bearer on which the entire body framework may be built in a secure manner.

A constructional example of the invention is shown diagrammatically in the accompanying drawing.

Fig. 1 is a diagrammatical perspective view of the invention. Fig. 2 is cross section on the line I—I of Fig. 1.

As shown, the floor of the vehicle is formed of the lower plate 1 and the upper plate 2, between which are interposed the longitudinal stiffening bearers 3 rigidly secured to the plates. In the front and rear part of the body, the plates diverge so as to form an inlet mouth 4 and likewise also at the rear an outlet mouth 5 which is connected either to the radiator or to the fan feed duct. The widened inlet in the interior of the floor bearer also has the advantage of assisting the forcing of the air under pressure into the space between the walls, and in addition, the longitudinal stiffening means may serve for distributing the air for various purposes. Thus, for example, the air from the two marginal compartments may be used for cooling the engine cylinders, while the central compartment may supply air for oil cooling and the like.

I claim:

A hollow floor for automobiles which have a rear engine compartment and inlets for air at the front part of the vehicle, said floor comprising an elongated tubular structure having a flat part of substantially rectangular cross section and having parallel sides from end to end, the ends of said tubular structure being outwardly upwardly flared to provide flared mouths, and longitudinal angle-iron braces extending inside the flat part of the tubular structure from one flared mouth to the other.

MILOŠ KLAVÍK.